United States Patent [19]

Edwards et al.

[11] Patent Number: 4,480,003

[45] Date of Patent: Oct. 30, 1984

[54] CONSTRUCTION FOR TRANSPARENCY FILM FOR PLAIN PAPER COPIERS

[75] Inventors: Donald W. Edwards; Terrance J. Russell; Donald J. Williams, all of St. Paul, Minn.

[73] Assignee: Minnesota Mining and Manufacturing Company, St. Paul, Minn.

[21] Appl. No.: 419,721

[22] Filed: Sep. 20, 1982

[51] Int. Cl.$^3$ .......................... B32B 3/02; B05D 5/12; G03G 7/00

[52] U.S. Cl. .................................... 428/329; 428/412; 428/413; 428/448; 428/451; 428/458; 428/461; 428/469; 428/483; 428/522; 428/523; 428/463; 428/913; 430/126

[58] Field of Search ............... 428/412, 413, 458, 461, 428/463, 469, 451, 448, 483, 522, 523, 329

[56] References Cited

U.S. PATENT DOCUMENTS

| | | | |
|---|---|---|---|
| 3,113,179 | 12/1963 | Glenn | 178/6.6 |
| 3,142,585 | 7/1964 | Katchman | 117/211 |
| 3,154,432 | 10/1964 | Herrick | 117/211 |
| 3,245,833 | 4/1966 | Trevoy | 117/201 |
| 3,291,601 | 12/1966 | Gaynor | 96/1.1 |
| 3,397,086 | 8/1968 | Bartfai | 117/218 |
| 3,618,752 | 11/1971 | Barker et al. | 206/57 |
| 3,853,614 | 12/1974 | Sheridon | 117/217 |
| 3,854,942 | 12/1974 | Akman | 96/1.2 |
| 3,893,935 | 7/1975 | Jadwin et al. | 252/62.1 |
| 3,949,148 | 4/1976 | Akman | 428/500 |
| 4,130,688 | 12/1978 | Garner | 428/342 |
| 4,306,996 | 12/1981 | Windhager | 428/451 X |

*Primary Examiner*—C. Ives

*Attorney, Agent, or Firm*—Donald M. Sell; James A. Smith; David L. Weinstein

[57] ABSTRACT

Transparency film for use in a plain paper electrostatic copier. The transparency film comprises (a) a flexible, transparent, heat resistant, polymeric film base, (b) an image receiving layer carried upon a first major surface of the film base, and (c) a layer of electrically conductive material carried on a second major surface of the film base. Where necessary a primer coat is interposed between the image receiving layer and the film base and/or between the layer of electrically conductive material and the film base. A protective coating is preferably applied over the layer of conductive material. This film can be used in either powder-toned or liquid-toned plain paper copiers for making transparencies.

18 Claims, 4 Drawing Figures

CONSTRUCTION FOR TRANSPARENCY FILM FOR PLAIN PAPER COPIERS

BACKGROUND OF THE INVENTION

This invention relates to a construction of a transparent sheet material for making transparencies in plain paper electrostatic copiers. More particularly, it relates to a transparency film which utilizes a coating of an electrically conductive polymer to improve acceptance of toner in image areas, thus improving the quality of the transparency.

As is well known, transfer electrostatic copying commonly involves imparting a uniform electrostatic charge, either positive or negative, depending on the specific machine under consideration, to a photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with the electrostatic charge remaining largely intact in the image areas. Next, oppositely charged toner material is brought into contact with the photoconducting surface and clings by electrostatic attraction to the charged areas of the surface. A sheet which is to receive the image is placed over the toner image, and is given a charge, such as by use of corona-discharge wires. As a result, a large portion of the charged toner on the photoconducting surface is transferred to the sheet. Finally, the toner is fused to the sheet by application of heat, pressure, or a combination of both.

Polymeric films have a tendency of acquiring a nonuniform electrostatic charge under certain conditions of contact triboelectric or induction charging. This tendency is undesirable when imaging transparency films in electrostatic copying machines. If charges on such films are not dissipated, toned images become distorted by electrostatic discharges within the copier. In the case of plain paper copiers employing liquid toner, for example, charges on the transparency film cause the liquid to form voids, or bubbles, in the formed images, thus distorting these images. This void-forming phenomenon is known as the "static bubble" effect.

Feeding a stack of plastic film sheets serially into copying machines is difficult because the buildup of electrostatic charges generated as the sheets slide off the stack causes the sheets to adhere to one another. This electrostatic adhesion prevents feeding of the film or causes creep or advancement of the film sheets that are below the uppermost sheet in a stack. Creep can cause jamming or misfeeds. Barker, U.S. Pat. No. 3,618,752 discloses the use of paper adhered to the film sheet as a means for promoting smooth feeding of film sheets. The paper apparently acts to prevent charge buildup, but it increases cost and creates a waste problem. Akman, U.S. Pat. No. 3,854,942 discloses adding a particulate material to a coating to produce a coated surface with raised areas. The use of particulate material separates one film sheet from another, thus reducing the static electrical charge between them.

A receptor film has been made by Minnesota Mining and Manufacturing Company by applying a receptor coating on one side, the image receiving side, of a transparent film base and a coating of antistatic conductive material on the reverse side of the transparent film base. The conductive coating is made from organic ammonium salts in an organic binder. Upon storage in a stack, the conductive coating on one side of one transparent film sheet comes in contact with the receptor coating on the image receiving side of the adjacent transparent film sheet. Under this condition, some of the antistatic conductive material on one transparency film sheet may migrate to the receptor coating of the adjacent transparency film sheet. When the latter transparency film passes through the copier, the areas containing the antistatic material on the receptor surface do not accept toner, thus resulting in speckled images.

SUMMARY OF THE INVENTION

This invention involves a transparency film for use in plain paper electrostatic copiers. The base of the transparency film is a flexible, transparent, heat resistant, polymeric sheet material. Upon a first major surface of the film base is coated an image receiving layer. This layer is preferably made of a toner-receptive, thermoplastic, transparent, polymethyl methacrylate polymer containing dispersed silica particles. On the second major surface of the film base is coated a layer comprising a non-migratory electrically conductive material. The conductive material of preference is a polymer derived from the reaction of pyridine and 2-amino pyridine with partially chloromethylated polysytrene. It is preferred that a primer coating be interposed between both the polymeric film base and the image receiving layer and the polymeric film base and the layer of conductive material. The primer coating should provide suitable adhesion of coatings to the film base. It is also preferred that the layer of conductive material be overcoated with a protective coating. The protective coating permits surface modification with other materials to control abrasion, resistance, roughness, and slip properties. The surface resistivity of the image receiving layer must equal or exceed $1\times10^{14}$ ohms per square. The surface resistivity of the layer comprising the conductive material must be from about $1\times10^{11}$ to about $5\times10^{13}$ ohms per square.

The present invention provides a polymeric film sheet suitable for use with a plain paper copier, which film sheet accepts toner in imaged areas corresponding to an original while maintaining clear background areas. The present invention also provides a polymeric film sheet which can be fed smoothly from a stack of sheets to plain paper copy machines.

DETAILED DESCRIPTION

Figure 1:
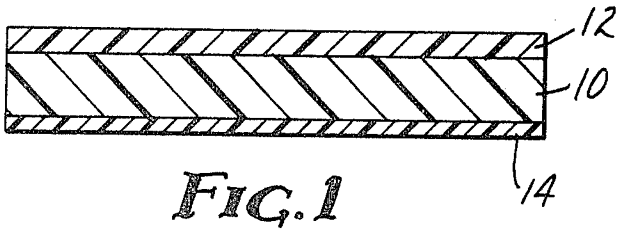
FIG. 1 is a cross-sectional view of the transparency film, one side of which is coated with an image receiving layer, the other side of which is coated with a layer of electrically conductive material.
Figure 2:
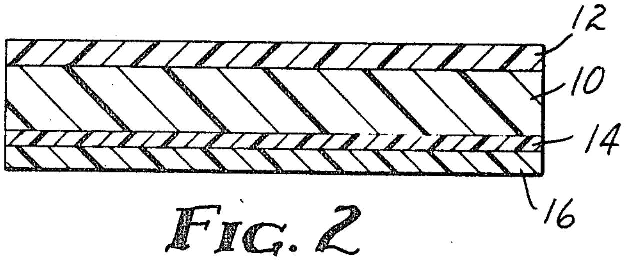
FIG. 2 is a cross-sectional view of the transparency film, one side of which is coated with an image receiving layer, the other side of which is coated with a layer of electrically conductive material, said conductive layer being overcoated with a protective coating.
Figure 3:
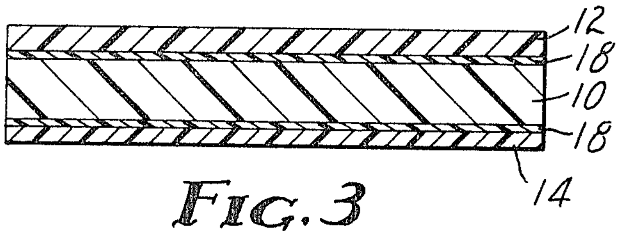
FIG. 3 is another embodiment of the transparency film of FIG. 1 in which the transparency film includes a primer coating on each side thereof.
Figure 4:
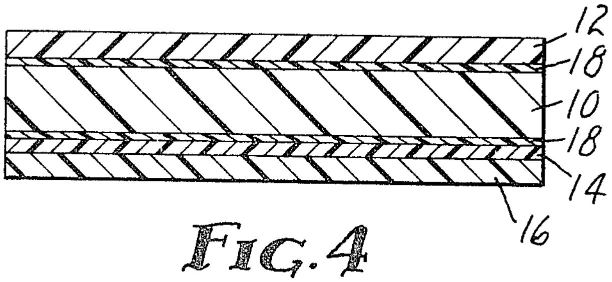
FIG. 4 is another embodiment of the transparency film of FIG. 2 in which the transparency film includes a primer coating on each side thereof.

Referring now to FIGS. 1, 2, 3, and 4, the transparency film of the present invention comprises:

(1) a film sheet base 10, made of a flexible, transparent, heat resistant, polymeric material, (2) an image receiving layer 12 coated upon one major surface of said film sheet base, (3) a layer of non-migratory electrically conductive material 14 coated upon the second major surface of the film sheet base, (4) an optional protective coating layer 16, overcoated upon the layer in (3), the protective coating layer being formed of a resin having lower electrical conductivity than the material of layer 14.

In addition, the film sheet base 10 may have a primer coating 18 for either the image receiving layer 12 or for the layer of conductive material 14, or for both layers. (See FIGS. 3 and 4).

The film sheet base 10 must have the proper degree of transparency for use in overhead projection, i.e., it must be transparent to visible light. It must have sufficient heat resistance to withstand a temperature of 150° C. Suitable materials include polyester, cellulose triacetate, polyimide, polycarbonate, and polysulfone. The preferred material is oriented polyethylene terephthalate film. The thickness of the film may range from about 0.001 to about 0.010 inch. The preferred thickness is about 0.003 to about 0.004 inch.

The image receiving layer 12 is essentially a transparent polymer coated upon the primed or unprimed film sheet base 10. Like the film sheet base, the image receiving layer 12 must be transparent to visible light. The image receiving layer 12 preferably contains a roughening agent to provide roughness to aid in sliding one sheet of finished film off the top of a stack of similar sheets. Increased surface area provided by the roughening agent also allows liquid toner to dry rapidly enough to avoid flowing out of the desired pattern, thus providing sharp images. It also results in improved toner adhesion.

Suitable materials for the image receiving layer 12 include polymethyl methacrylates, polyesters, cellulosics, polyvinyl acetates, polyvinyl chlorides, vinyl chloride/vinyl acetate copolymers, acrylonitrile-butadienestyrene terpolymers, polyvinylidene chlorides, polyurethanes, polymethacrylates, substituted polystyrenes, and other thermoplastic or cross-linked resins. The preferred resin material is polymethyl methacrylate.

Suitable roughening agents include amorphous silica, aluminum hydrate, calcium carbonate, magnesia, and urea-formaldehyde polymer particles.

The coating weight of the image receiving layer 12 is preferably about 150 mg per square foot. The coating weight may range from about 10 to about 1000 mg per square foot. The image receiving layer 12 may be applied by conventional coating techniques. It is preferably applied by roll coating. Suitable solvents for coating include acetone, ethyl acetate, methyl ethyl ketone, methylene chloride or blends thereof with such diluents as toluene or xylene.

The surface resistivity of the image receiving layer must equal or exceed a value of about $1\times10^{14}$ ohms per square. This resistivity is measured in accordance with ASTM D 257-78. The apparatus employed to measure the surface resistivity includes (a) Model 6105 Resistivity Adapter, (b) Model 2401 High Voltage Supply, and (c) Model 410 A Picoammeter, all manufactured by Keithley Instruments, Inc., Cleveland, Ohio. The temperature at the time of measurement is $21\pm3°$ C.; the relative humidity at the time of measurement is $30\pm10\%$. The sample size is 3½-inch by 3½-inch. Resistivity is measured at 100 volts. One skilled in the art can readily employ the Keithley apparatus to reproduce the foregoing measurements.

The layer of electrically conductive material 14 must be transparent to visible light, non-migratory, and must adhere to the transparency film base material or the known priming materials. The surface resistivity of the layer of conductive material should be less than about $5\times10^{13}$ ohms per square, but not less than about $1\times10^{11}$ ohms per square. The same conditions and apparatus employed in measuring the surface resistivity of the image receiving layer 12 are employed in measuring the surface resistivity of the layer of conductive material 14. Conductive materials that have a surface resistivity of less than $1\times10^{11}$ ohms per square may be used by reducing the coating weight, thus reducing the cross-sectional area and raising the resistance to current flow. When the conductive layer 14 is used in conjunction with a protective coating layer 16, the surface resistivity of the composite coating formed from the layers 14 and 16 should range from about $1\times10^{11}$ ohms per square to about $5\times10^{13}$ ohms per square.

The electrically conductive material may be either organic or inorganic. In the organic area, the conductive material is a conductive resin, or conductive polymer. The preferred polymers are certain adducts of a styrene-vinyl benzyl copolymer. These polymers are water-insoluble and highly resistant to fingerprinting and variations in humidity. Upon being stored under conditions of high humidity, these conductive polymers resist migration to the image receiving layer of adjacent film sheets. The property of non-migration is critical in the present invention. Conventional antistatic agents generally migrate from their substrates during handling. They are easily rubbed, wiped or rinsed off plastic substrates. The conductive materials employed in the present invention resist migration form the film base 10 or primer coating 18 during storage and handling. The water-insoluble conductive polymers of the present invention, particularly the adducts of styrene-vinyl benzyl copolymer, do not migrate even when a protective coating layer is not used. The water-soluble conductive polymers which can be employed in the present invention also do not migrate in the absence of a protective coating layer. However, the absence of a protective coating layer is undesirable in the case of the water-soluble conductive polymers because of the tendency for fingerprints to appear on the polymer.

A particularly preferred electrically conductive polymer is a polymer derived from the reaction of pyridine and 2-amino pyridine with partially chloromethylated polystyrene. This resin is represented by the following general formula:

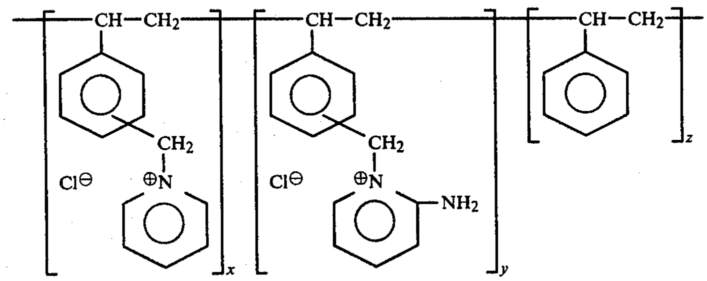

wherein $x+y+z+1.0$, and x represents the mole fraction of the pyridine adduct in the copolymer, y represents the mole fraction of the 2-amino pyridine adduct in the copolymer, z represents the mole fraction of the unsubstituted phenyl portion of the copolymer.

Representative values of x, y and z are 0.25, 0.25, and 0.50, respectively. The particular values of x, y and z are not critical. The number average molecular weight of this polymer is preferably in the range of about 60,000 to about 105,000. The number average molecular weight may be as low as 25,000. The number average molecular weight may also exceed 105,000. The vinyl benzyl chlorides preferred for preparation of the copolymer are the para- and meta-vinyl benzyl chlorides.

Other suitable polymers include the reaction products of the following materials with partially chloromethylated polystyrene:

(a) pyridine
(b) 2-amino pyridine
(c) dimethyl hydrazine
(d) triphenyl phosphine These polymers, i.e., copolymers, may be represented by the following structural formulas:

(a) pyridine only

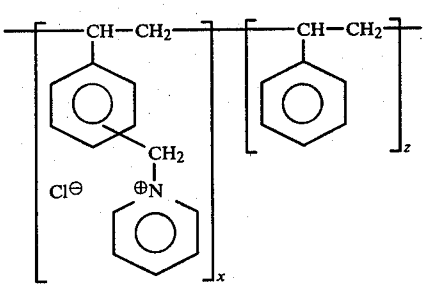

wherein $x+z=1.0$, and x represents the mole fraction of the pyridine adduct in the copolymer, z represents the mole fraction of the unsubstituted phenyl portion of the copolymer.

(b) 2-amino pyridine only

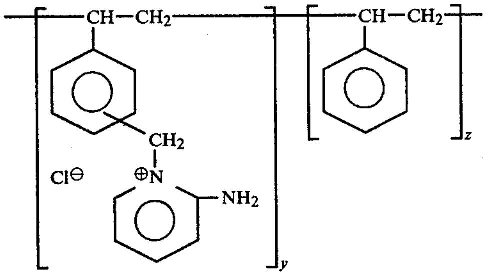

wherein $y+z=1.0$, and y represents the mole fraction of the 2-amino pyridine adduct in the copolymer, z represents the mole fraction of the unsubstituted phenyl portion of the copolymer.

(c) dimethyl hydrazine

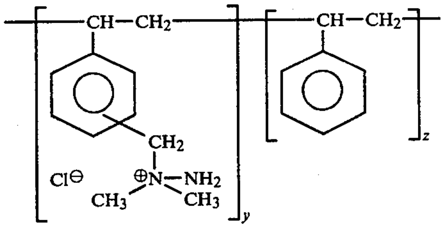

wherein $y+z=1.0$, and y represents the mole fraction of the dimethyl hydrazine adduct in the copolymer, z represents the mole fraction of the unsubstituted phenyl portion of the copolymer.

(d) triphenyl phosphine

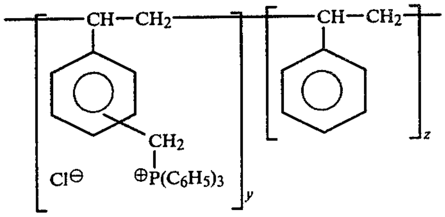

wherein $y+z=1.0$, and y represents the mole fraction of the triphenyl phosphine adduct in the copolymer, z represents the mole fraction of the unsubstituted phenyl portion of the copolymer.

The precise values of x, y, and/or z are not critical. However, it is critical that the mole fraction represented by z be sufficiently high so that the conductive polymer is insoluble in water and the mole fraction represented by z be sufficiently low so that the conductive polymer exhibits electrical conductivity, or surface resistivity, in the proper range.

Other electrically conductive resins which can be used include polymers of epoxy silane and silane sulfonate. These polymers are disclosed in Balchunis, et al., U.S. Ser. No. 363,870, filed Mar. 31, 1982 and assigned to Minnesota Mining and Manufacturing Co. This application is incorporated herein by reference. Commercially available conductive resins which can be used include No. 261®LVF, a water soluble quaternary ammonium polymer available from Merck & Co., Rahway, N.J., VERSA-TL®125, the ammonium salt of polystyrene sulfonic acid, available from National Starch and Chemical Corp., Bridgewater, N.J., and ECR 34, a water soluble vinylbenzyl trimethyl ammonium chloride polymer, available from Dow Chemical Co., Midland, Mich. However, No. 261®LVF, ECR 34, and VERSA-TL®125, being water soluble, are easily fingerprinted and are somewhat soft. If these polymers are used, a protective coating layer should be used to reduce the effect of these deficiencies.

The desired surface resistivity of the electrically conductive polymer layer 14 may be achieved by mixing the conductive polymer with a conventional, non-conductive polymer. Non-conductive polymers which are compatible with the preferred conductive polymer, e.g., the polymer derived from the reaction of pyridine and 2-amino pyridine with partially chloromethylated polystyrene, include polyvinyl acetate and polymethyl methacrylate. At least about 5 percent conductive polymer must be employed in the blend in order to form a suitable conductive layer. The blended conductive polymer does not require a protective coating layer. The blended conductive polymer layer should have a surface resistivity of from about $1\times10^{11}$ to about $5\times10^{13}$ ohms per square as measured by standard procedures under the conditions, and with the apparatus, previously set forth.

The coating weight of the conductive polymer layer 14 may range from about 0.5 to about 50 mg per square foot.

The conductive polymer may be applied by conventional techniques. The polymer is preferably applied by rotogravure coating from a 0.10 weight percent solution in methyl alcohol. Other suitable solvents for coating include ethyl alcohol or blends of methyl alcohol and ethyl alcohol. A wetting agent may also be used to aid in coating. Non-ionic surfactants are the preferred wetting agents. Suitable non-ionic surfactants include alkyl aryl polyether alcohols. Incorporation of surfactants into the solution of conductive polymer in methanol gives a more uniform conductive layer when the conductive coating is applied.

It is desirable to add lubricants to the conductive coating, in the case where a protective coating is not used, in order to permit proper sheet exiting from certain copier units. Suitable lubricants include fatty acids and fatty alcohols. A preferred lubricant is polyphenylmethylsiloxane. The lubricant operates to reduce the coefficient of sliding friction on the copier exit tray.

If an inorganic conductive material is utilized for the electrically conductive layer 14, the conductive material may be a conductive metal or conductive metal oxide. Metals such as aluminum, copper, silver, and gold, oxides such as tin oxide or indium oxide can be vapor deposited at extremely low coating weight to achieve the required conductivity for the conductive layer, while still meeting transparency requirements. Inorganic compounds such as cuprous iodide and silver iodide can also be added to conductive resins to produce conductive layers. Trevoy, U.S. Pat. No. 3,245,833 discloses a method of making an electrically conductive coating by incorporating inorganic compounds into film-forming binder materials.

A transparent polymer or resin having an electrical conductivity lower than that of the layer of conductive material may be used to provide a protective coating 16 over the conductive layer 14. The material for the protective coating layer 16 can have a surface resistivity in excess of $10^{16}$ ohms per square, when measured by itself. However, when coated upon the conductive layer 14, the surface resistivity of the composite coating, i.e. the conductive layer coating 14 overcoated with the protective coating layer 16, should range from about $1\times10^{11}$ ohms per square to about $5\times10^{13}$ ohms per square, as measured by standard procedures under the conditions, and with the apparatus, previously set forth. The polymer for the protective coating layer 16 must be transparent to visible light and must adhere to the more conductive layer 14. In addition, it must exhibit low friction against adjacent sheets and against fixed surfaces in the paper paths of copying machines. It must also have a high resistance to finger printing and other handling problems such as scratching. The protective coating 16 is not necessary if the layer of conductive material 14 is non-migrating, highly resistant to scratching and finger printing, and has proper sliding properties. As stated previously, a non-migratory coating is one which does not transfer to adjacent objects, in particular, to the image receiving layer of an adjacent transparency film sheet in a stack of such sheets.

Suitable resins for the protective layer 16 include polyesters, polystyrene derivatives, polymers and copolymers of vinyl chloride and vinyl acetate, acrylic polymers, polyurethanes, and acrylonitrile-butadienestyrene copolymers. The preferred resin is polymethyl methacrylate. In order to reduce the friction of this layer against adjacent sheets and against machine parts, a friction reducing agent can be added to the resin. Suitable friction reducing agents include amorphous silica, urea formaldehyde, lubricants such as silicones, mineral oil, fatty acids, and fatty alcohols. The preferred friction reducing agent is polyhydroxysilicone oil (Q1-3563 manufactured by Dow Corning Corporation). The protective coating layer may be applied by conventional coating techniques. Suitable coating solvents include toluene and methyl ethyl ketone. The protective coating layer may also contain a roughening agent to aid in sliding a sheet of the film off the top of a stack of similar sheets. Suitable roughening agents include those that are suitable for the image receiving layer.

The thickness of the protective coating 16 affects the surface resistivity of the composite coating, i.e. the conductive layer 14 and the protective coating layer 16, of the transparency film as measured in accordance with ASTM D 257-78 under the conditions previously set forth. The composite coating exhibits an increase in surface resistivity as the thickness of the protective coating layer 16 is increased. The following Table demonstrates this relationship. The coating weight of the conductive layer 14 was held constant at 0.020 g/$ft^2$.

TABLE I

| Approximate Thickness of Protective Coating | Surface Resistivity of Composite Coating (30 ± 10% R.H.) Ohms Per Square |
|---|---|
| 0.9 μm | $2 \times 10^{12}$ |
| 2.2 μm | $4 \times 10^{13}$ |
| 4.0 μm | $5 \times 10^{15}$ |

The thickness of the conductive layer 14 also affects the surface resistivity of the composite coating. Table II demonstrates the relationship between thickness of the conductive layer 14 and surface resistivity of the composite coating. The thickness of the conductive layer is directly proportional to its coating weight. (The thickness of the protective coating layer 16 was held constant at 1.2 μm).

TABLE II

| Coating Weight of Conductive Layer (g/$ft^2$) | Surface Resistivity (30 ± 10% R.H.), Ohms Per Square | |
|---|---|---|
| | No Protective Coating | 1.2 μm Protective Coating |
| .002 | $4 \times 10^{12}$ | $2 \times 10^{14}$ |
| .020 | $2 \times 10^{11}$ | $1 \times 10^{13}$ |

Conductive materials which are water-insoluble do not require a protective coating layer. The water-insoluble conductive materials which do not require a protective coating include the group of polymers derived from the reaction of partially chloromethylated polystyrene with the following:

(a) pyridine and 2-aminopyridine,
(b) pyridine only,
(c) 2-aminopyridine only,
(d) dimethyl hydrazine, or
(e) triphenyl phosphine.

A protective coating layer 16 may be used with water-insoluble conductive materials, however, in order to enhance resistance to scratching and fingerprinting, and improve sliding properties. Conductive materials which are water-soluble must be overcoated with a protective coating layer 16. The protective coating layer 16 will not only improve resistance to scratching and fingerprinting, but will also aid in sliding a sheet of the film off the top of a stack of similar sheets.

A primer coating 18 may be employed to assure adhesion of the image receiving layer 12 and/or the layer of conductive material 14 to the transparency film base 10. Certain image receiving layer materials and certain conductive layer materials exhibit sufficient adhesion to the transparency film base 10 so that a primer coating 18 is unnecessary. If a primer coating 18 is necessary, or desired, suitable primer coatings include polyester resins, polyvinyl acetate, and polyvinylidene chloride. Particularly preferred primer materials include organic soluble polyester resins, such as the polyester prepared from 35 percent isophthalic acid/65 percent terephthalic acid and 95 percent ethylene glycol/5 percent diethylene glycol, and copolymers of polyvinylidene chloride and methyl acrylate. Vitel ®100, a polyester resin manufactured by Goodyear Tire and Rubber Co., coated from a 50 percent toluene/50 percent methyl ethyl ketone blend at a 20 mg per square foot dry weight on each side of the film base 10, provides acceptable overall transparency performance when used with the conductive resin on one side of the film base 10 and/or with the image side coating on the other side of the film base 10. Other suitable primers depend on the nature of the resins and transparency film bases used. The coating weight of a typical primer coating may range from about 10 to about 50 mg per square foot. Of course, the primer coating must be transparent to visible light.

Suitable methods for preparing each of the component coatings or layers of the transparency is described below:

Preparation of the Transparency Film Base 10

The film base 10 is preferably an oriented polyethylene terephthalate film. The film base may be used without any treatment; however, in order to assure a high degree of adhesion between the film base 10 and the image receiving layer 12 and between the film base 10 and the conductive polymer layer 14, the transparency film base should have both sides coated with a suitable primer coating 18.

Preparation of Image Receiving Layer 12

The roughening agent is dispersed in a polymer/solvent solution. A typical mixture will contain the following ingredients in the amount indicated:

Solvent: 50 to 99 parts by weight
Polymer: 1 to 50 parts by weight
Roughening Agent: up to 25 parts by weight per 100 parts by weight resin The roughening agent is dispersed by homogenizing the entire solution. The solution is then coated onto one side of the transparency film base 10, primed or unprimed as the case may be, and dried such that the coating weight may range from about 10 to about 1,000 mg/$ft^2$.

Preparation of Electrically Conductive Layer 14

The conductive polymer, wetting agent, and solvent are mixed together. A typical mixture will contain the following ingredients in the amount indicated:

Solvent: 100 to 10,000 parts by weight
Polymer: 1 to 100 parts by weight
Wetting Agent: 1 to 100 parts by weight The resulting solution is coated onto the side of the transparency film base 10 that is opposite to the side bearing the image receiving layer 12. The coating is then dried. The coating weight may range from about 0.5 to about 50 mg/$ft^2$.

Preparation of Protective Coating Layer 16

The roughening agent is dispersed in a resin/solvent solution. A typical mixture will contain the following ingredients in the amount indicated:

Solvent: 50 to 99 parts by weight
Resin: 1 to 50 parts by weight
Roughening Agent: up to 25 parts by weight per 100 parts by weight resin
Lubricant: up to 10 parts by weight per 100 parts by weight resin The roughening agent is dispersed by homogenizing the entire solution. The solution is then coated over the conductive resin layer 14 and dried such that the coating weight may range from about 10 to about 1000 mg/$ft^2$. As stated previously, a protective coating layer 16 is required only in the case in which the conductive resin layer has low resistance to abrasion or fingerprinting. However, it is preferred in all cases.

This film will make good transparencies on a wide variety of both wet and dry toner machines. Typical characteristics are:

| | |
|---|---|
| Coefficient of friction of image receiving layer to protective coating layer | 0.10 to 0.70 |
| Sheffield smoothness, image receiving layer | 5 to 100 Sheffield units |
| Sheffield smoothness, protective coating layer | 5 to 100 Sheffield units |
| Surface resistivity of image receiving layer [ASTM D257-78: Apparatus included Model 6105 Reisistivity Adapter, Model 2401 High Voltage Supply, Model 410A Picoammeter, all manufactured by Keithley Instruments; temperature = 21° C.; relative humidity = 30%; sample size = 3½ inch × 3½ inch; voltage = 100 volts] | $1 \times 10^{14}$ ohms per square or greater square or greater |
| Surface resistivity of composite of protective coating layer and conductive coating layer (same conditions as for image receiving layer) | $1 \times 10^{11}$ to $5 \times 10^{13}$ ohms per square |
| Surface voltage after charging 20 seconds at 95 microamps on an M/K Systems, Inc. Stati-Tester, Model 169C | 500 to 1000 volts |
| Surface voltage after 30 seconds decay time, MKS Statitester | less than 250 volts |

Transparency films constructed according to the present invention are found to effectively dissipate static charges generated within the paper path of plain paper copying machines. If these charges are not dissipated, the toner pattern or image becomes distorted by electrostatic discharge within the machine. These transparency films can be used in liquid toned plain paper copiers. They can be fed in the multiple feed mode, as from a stack, and they will not display undesirable static discharge distortions in the image areas.

The invention will now be further described in terms of specific illustrative examples. It should be understood, however, that the invention is not limited to the specific details set forth in the examples.

EXAMPLE I

The composition for the image receiving layer 12 was prepared by mixing the following ingredients in the amounts indicated:

| Ingredient | Parts by Weight |
|---|---|
| Methyl ethyl ketone | 4400 |
| Toluene | 4400 |
| Polymethyl methacrylate resin (Elvacite ® 2041, E. I. duPont de Nemours & Co.) | 1200 |
| Amorphous silica, 7 micron (Syloid ® 162, W. R. Grace & Co.) | 36 |
| Amorphous silica 3 micron (Syloid ® 244, W. R. Grace & Co.) | 12 |

The amorphous silica was dispersed by homogenizing the entire solution. The solution was then coated onto one side of polyethylene terephthalate film 10, both sides of which had been previously primed with polyvinylidene chloride. Tthe solution was then dried such that the coating weight was about 0.15 gram per square foot. This is layer 12 in FIG. 4.

The composition for the electrically conductive layer 14 was prepared by mixing the following ingredients in the amounts indicated:

| Ingredient | Parts by Weight |
|---|---|
| Methanol | 10,000 |
| Conductive polymer | 12.5 |
| Wetting agent (alkyl aryl polyether alcohol, Triton ® X-100, Rohm & Haas Co.) | 2.5 |

The conductive polymer was the polymer formed from the reaction of pyridine and 2-amino pyridine with partially chloromethylated polystyrene, i.e.,

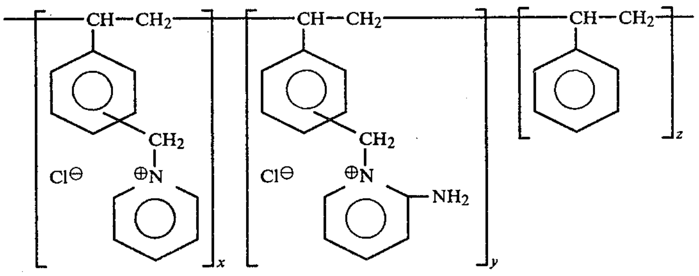

where $x=0.25$, the mole fraction of the pyridine adduct in the copolymer, $y=0.25$, the mole fraction of the 2-amino pyridine adduct in the copolymer $z=0.50$, the mole fraction of the unsubstituted phenyl portion of the copolymer.

The polymer is prepared by first reacting styrene and vinyl benzyl chloride to form a copolymer of styrene and vinyl benzyl chloride. The copolymer is then reacted with pyridine and 2-amino pyridine to form the final polymer. Specifically, 16.4 parts by weight styrene, 14.5 parts by weight vinyl benzyl chloride and 66.9 parts by weight water were charged to a glass-lined reaction vessel along with the following materials:

1.5 parts by weight sodium lauryl sulfate 0.2 parts by weight sodium bicarbonate 0.2 parts by weight potassium persulfate 0.1 parts by weight dodecyl mercaptan 0.1 parts by weight sodium m-bisulfite Sixty percent meta-vinyl benzyl chloride and forty percent para-vinyl benzyl chloride copolymer, the reaction mixture was extracted with 120 parts by weight toluene. To the resulting copolymer solution was added 73.9 parts by weight ethyl alcohol, 6.5 parts by weight pyridine, 23.7 parts by eight acetone, and 3.8 parts by weight 2-amino pyridine. After the reaction was complete, the resulting polymer was diluted with 132.1 parts by weight methyl alcohol.

The conductive polymer was coated onto the side of the polyester film 10 opposite to the side containing the image receiving layer 12 and then dried to a dry coating weight of about 0.002 gram per square foot. This is layer 14 in FIG. 4.

The composition for the protective coating was prepared by mixing the following ingredients in the amounts indicated:

| Ingredient | Parts by Weight |
|---|---|
| Methyl ethyl ketone | 4400 |
| Toluene | 4400 |
| Polymethyl methacrylate resin (Elvacite ® 2041, E. I. duPont de Nemours & Co.) | 1200 |
| Amorphous silica, 7 micron (Syloid ® 162, W. R. Grace & Co.) | 10 |
| Polyhydroxy silicone oil (Q1-3563, Dow Corning) | 6.5 |

The solution was homogenized to disperse the amorphous silica. The solution was then coated over the conductive layer 14. The preferred coating weight was 0.15 gram per square foot. This is layer 16 in FIG. 4.

The characteristics of this film are as follows:

| | |
|---|---|
| Coefficient of friction of image receiving layer to protective coating layer (ASTM D1894-78) | 0.45 |
| Coefficient of fraction of tray of Savin 770 copier to protective coating layer (ASTM D1894-78) | 0.62 |
| Sheffield smoothness, image receiving layer | 35 Sheffield units |
| Sheffield smoothness, protective coating layer | 7 Sheffield units |
| Surface resistivity of image receiving layer (same conditions as those used in previous measurements) | $1 \times 10^{15}$ ohms per square |
| Surface resistivity of composite of protective coating layer and conductive coating layer (same conditions as those used in previous measurements) | $1 \times 10^{13}$ ohms per square |
| Surface voltage after charging 20 seconds at 95 microamps on an MKS Statitester | 800 volts |
| Surface voltage after 30 seconds decay time, MKS Statitester | 50 volts |

EXAMPLE II

The polyethylene-terephthalate film 10, the priming layers 18, and the image receiving layer 12 of this example were identical to those of Example I.

The composition for the electrically conductive layer was prepared by mixing the following ingredients in the amounts indicated:

| Ingredient | Parts by Weight |
|---|---|
| 10% solution epoxy silane/ silane sulfonate resin in methanol | 40 |
| Methanol | 60 |

The epoxy silane/silane sulfonate resin was derived from the combination of an aqueous solution of the epoxy silane.

$$CH_2\overset{O}{—}CHCH_2O(CH_2)_3—Si(OCH_3)_3$$

and a silane sulfonate that is derived from the foregoing epoxy silane $$(HO)_3Si—CH_2CH_2CH_2—O—CH_2\overset{OH}{C}HCH_2SO_3^-H^+.$$

The combination of epoxy silane and the silane sulfonate derived from the epoxy silane may be effected by the following procedure:

200 parts by weight of the epoxy silane is agitated with 100 parts by weight of water for about 90 minutes at ambient temperature. 295 parts by weight of the epoxy silane in 147.5 parts by eight of water is added to a solution of 157.5 parts by weight of sodium sulfite and 400 parts by weight of water. The mixture is stirred and reacted at 50° C. for 16 hours. The pH of the resulting silane sulfonate is 12.8. The solution is then passed through an ion exchange resin to provide a solution having a pH of less than 1. The solution is adjusted to 23% solids by weight by addition of water. 30 parts epoxy silane is then combined with 15 parts silane sulfonate to form the conductive polymer.

The resin resulting from the combination of epoxy silane and silane sulfonate was diluted to a 10% concentration in methanol.

The solution was applied with a No. 9 Mayer rod to the side of the polyester film opposite to the side containing the image receptive layer 12. The coating weight was about 0.05 gram/square foot.

The composition for the protective coating was prepared by mixing the following ingredients in the amounts indicated:

| Ingredient | Parts by Weight |
|---|---|
| Polymethyl methacrylate resin (Elvacite ® 2041, E. I. duPont de Nemours & Co.) | 1200 |
| Methyl ethyl ketone | 4400 |
| Toluene | 4400 |
| Urea formaldehyde particles (8 micron; Cab-O-Lite ® 100, Cabot Corporation) | 33 |

The solution was homogenized to disperse the urea-formaldehyde particles, and then coated over the conductive layer to give a coating weight of about 0.15 gram per square foot. The properties of this film are as follows:

| | |
|---|---|
| Coefficient of friction of image receiving layer to protective | 0.60 |

-continued

| | |
|---|---|
| coating layer (ASTM D1894-78) | |
| Sheffield smoothness, image receiving layer | 35 Sheffield units |
| Sheffield smoothness, protective coating layer | 7 Sheffield units |
| Surface resistivity of image receiving layer (same conditions as those used in previous measurements) | $1 \times 10^{15}$ ohms per square |
| Surface resistivity of composite of protective coating layer and conductive coating layer (same conditions as those used in previous measurements) | $3.5 \times 10^{13}$ ohms per square |
| Surface voltage, after 20 seconds charge at 95 microamps on an MKS Statitester | 750 volts |
| Surface voltage, after 30 seconds, decay time, MKS Statitester | 50 volts |

EXAMPLE III

Sheet samples were prepared by prime-coating both sides of 4-mil clear polyethylene terephthalate film with polyvinylidene chloride from an emulsion polymerization latex and drying in a 175° F. oven to yield a coating weight on each side of 20 mg/square foot.

The conductive polymer of Example I was applied to one side of the polyester film from a 0.10 weight percent solution in methyl alcohol and dried two minutes at 175° F. to yield a dry weight of 2 mg/square foot.

The other side of the polyester film, i.e. the image receiving side, was coated with polymethyl methacrylate, Elvacite ®2041, from a 12 weight percent solution in 50 percent toluene/50 percent methyl ethyl ketone having a 0.50 precent content of Cab-O-lite ®100 pigment. The image receiving layer was applied with a #120 knurl rotogravure coater and dried in a 200° F. oven for two minutes to yield a coating of 200 mg/square foot. Cab-O-Lite ®100, a cross-linked condensation polymer of urea and formaldehyde having an agglomerate means size of 8 microns, was dispersed in the resin solution by one pass through a Manton-Gaulin Lab Homogenizer at 4000 psi.

Transparencies were prepared by single-feeding the prepared sheets in Savin 760 and 770 liquid-toner copier units. Uniform imaging resulted. Ccontrol sheets having no conductive coating exhibited "static bubble" void defects in image areas.

EXAMPLE IV

The method of preparation utilized in Example III was repeated in this example, with the following exceptions:

(1) A surfactant, Triton ®X-100, and alkylaryl polyether alcohol from Rohm and Haas Co., was added to the conductive polymer. The concentration of the surfactant was 0.02 weight percent in 0.10 weight percent conductive polymer in methanol solution.

(2) A lubricant, Dow Corning ®556 cosmetic grade fluid, a polyphenylmethylsiloxane from Dow Corning Corp., was added to the conductive polymer solution. The concentration of the lubricant was 0.04 weight percent based on the weight of solution in (1).

(3) A blend of synthetic amorphous silicas was added to the image receiving layer coating solution. Syloid ®162 and Syloid ®244, synthetic amorphous silicas from W. R. Grace & Co., were dispersed in Elvacite ®2041, a polymethyl methacrylate from E. I. duPont de Nemours & Co. The amount of each component in the image receiving layer coating and the conductive layer is listed in Table III. Table III also sets forth a preferred coated film composition.

TABLE III

| Component | Weight Percent | Coating Weight (mg/sq. ft.) |
|---|---|---|
| A. Image Receiving Layer | | |
| 1. Elvacite ® 2041 | 96.0 | 200 |
| 2. Syloid ® 162 | 3.0 | |
| 3. Syloid ® 244 | 1.0 | |
| B. Primer Coating | | |
| 1. Polyvinylidene chloride | 100.0 | 20 |
| C. Base Film | | |
| 1. 4-mil clear polyethylene terephthalate | 100.0 | — |
| D. Primer Coating | | |
| 1. Polyvinylidene chloride | 100.0 | 20 |
| E. Conductive Layer | | |
| 1. Conductive polymer | 69.0 | 2 |
| 2. Dow ® Corning 556 | 20.7 | |
| 3. Triton ® X100 | 10.3 | |

Testing of the foregoing transparency material yielded the following results:

TABLE IV

| | Image Receiving Layer | Conductive Layer |
|---|---|---|
| Sheffield Smoothness, Sheffield units | 33 | 0 |
| Surface resistivity, ohms per square (74° F., 35% relative hymidity; remaining conditions were the same as those used in previous measurements) | $5.9 \times 10^{14}$ | $7.6 \times 10^{11}$ |
| Coefficient of friction | 0.55 | |
| Image receiving layer to conductive layer, static (ASTM D1894-78) | | |
| Conductive layer to tray of Savin 770 copier, sliding (ASTM D1894-78) | 0.58 | |
| Gardner Haze, percent | 8.0 | |

EXAMPLE V

The following polymeric materials were employed for the electrically conductive coating layer:

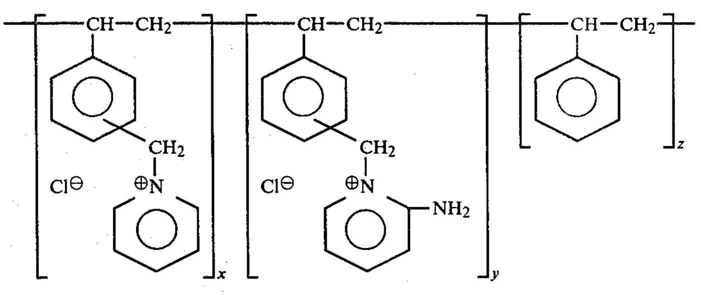

I where
$x+y+z=1.0$, and
$x$=the mole fraction of the pyridine adduct in the copolymer,
$y$=the mole fraction of the 2-amino pyridine adduct in the copolymer,
$z$=the mole fraction of the unsubstituted phenyl portion of the copolymer.

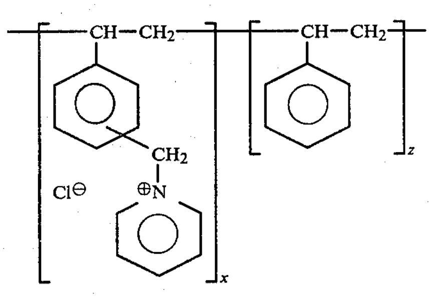

II where
$x+z=1.0$, and
$x$=the mole fraction of the pyridine adduct in the copolymer,
$z$=the mole fraction of the unsubstituted phenyl portion of the copolymer.

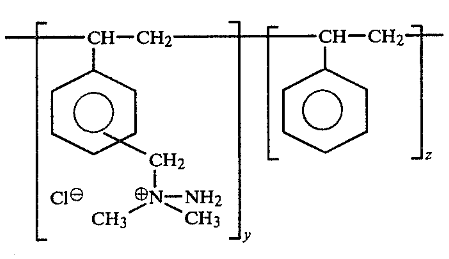

III where
$y+z=1.0$, and
$y$=the mole fraction of the dimethyl hydrazine adduct in the copolymer,
$z$=the mole fraction of the unsubstituted phenyl portion of the copolymer.

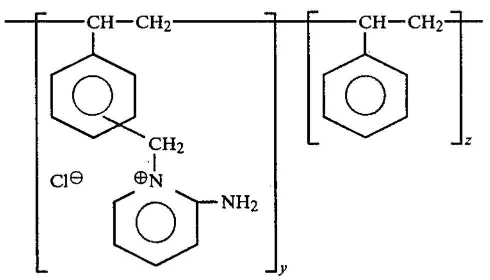

IV where
$y+z=1.0$, and
$y$=the mole fraction of the 2-amino pyridine adduct in the copolymer,
$z$=the mole fraction of the unsubstituted phenyl portion of the copolymer.

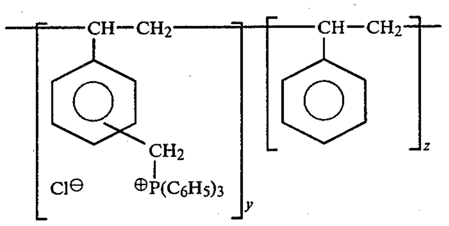

V where
$y+z=1.0$, and
$y$=the mole fraction of the triphenyl phosphine adduct in the copolymer,
$z$=the mole fraction of the unsubstituted phenyl portion of the copolymer.

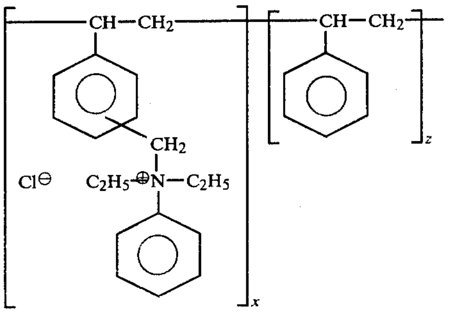

VI where
$x+z=1.0$, and
$x$=the mole fraction of the diethylphenylamine adduct in the copolymer, z=the mole fraction of the unsubstituted phenyl portion of the copolymer.

VII

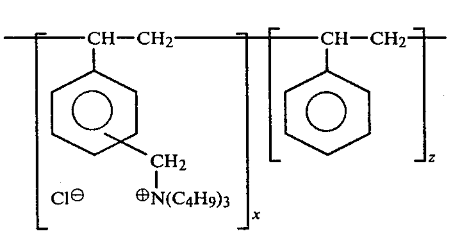

where x+z=1.0, and x=the mole fraction of the tributylamine adduct in the copolymer, z=the mole fraction of the unsubstituted phenyl portion of the copolymer.

As previously stated, the precise values of x, y, and/or z are not critical, but the mole fraction of the unsubstituted phenyl portion of the copolymer must be high enough so that the conductive polymer is insoluble in water and low enough so that the conductive polymer exhibits surface resistivity in the proper range.

Solutions were prepared at 10% (by weight) concentration in methyl alcohol, except for VI, which was insoluble in methyl alcohol, methyl ethyl ketone, methylene chloride, acetone, and toluene. The 10% polymer in methyl alcohol solutions of each were used for preparation of 1.0%5 and 0.10% concentrations of polymer in methyl alcohol. all three concentrations of each resin were swab-coated on polyvinylidene chloride primed 4 mil polyethylene terephthalate film and dried for two minutes in an oven at 120° F. The following tests were conducted on the samples:

A. Surface Conductivity—74° F., 61% relative humidity; remaining conditions were the same as those used in previous surface resistivity measurements.

B. Coefficient of Sliding Friction—50 g. weight and exit tray of Savin 770 copier.

C. Abrasion or Scuffing Resistance—sample tested by wiping an area ten times with paper tissue at moderate rub pressure.

D. Fingerprinting Resistance abrasion resistance. Therefore, it is desirable to employ a protective coating when these polymers are used for preparing transparency film. Fingerprint resistance is fair to good for the polymers tested. Polymers I and II exhibit the lowest coefficient of sliding friction.

Samples of the 1% and 0.1% solutions coated on 4 mil polyethylene terephthalate film were taped on plain 8½ in.×11 in. bond paper and run through a Savin 770 Copier.

A sheet of uncoated polyvinylidene chloride primer coated 4-mil polyester film was used as a control. Copy quality results are set forth in Table VI:

TABLE VI[1]

| Polymer | 1% Solution Coating | 0.1% Solution Coating |
|---|---|---|
| I | C− | A |
| II | C− | B+ |
| III | B | A |
| IV | B | A (poor edge acuity) |
| V | B+ | A+ (poor edge acuity) |
| VII | A | A+ (poor edge acuity) |
| No coating (control) | B | B+ |

[1]In rating Copy Quality, the following scale was used: A = dark image; B = medium dark image; C = light image.

Copies prepared from transparency film having a conductive coating of the 1% solution indicate that coatings from Polymers I and II were too conductive, thus resulting in weak images. The samples having a conductive coating of the 0.1% solution all gave acceptable image density. However, the polymers which provided low conductivity at this concentration resulted in poor edge acuity. Suitable transparencies can be prepared with a plain paper copier when the backside, i.e., the side which does not receive the image, is coated with a conductive polymer formed from a reaction product of partially chloromethylated polystyrene.

What is claimed is:

1. In an optically transparent film which can be electrostatically imaged and which comprises (a) a flexible, transparent, heat resistant polymeric film base, (b) a toner-receptive layer carried on a first major surface of said film base, said toner-receptive layer

TABLE V

| Polymer | Appearance[1] | Surface Conductivity Amp @ 100V 10% | 1% | 0.1% | Coefficient of Sliding Friction 10% | 1% | Fingerprint Resistance[2] 10% | 1% | Abrasion Resistance[3] 10% |
|---|---|---|---|---|---|---|---|---|---|
| I | clear light yellow | $0.20 \times 10^{-4}$ | $8.0 \times 10^{-6}$ | $5.0 \times 10^{-8}$ | 0.64 | 0.62 | B | B | C |
| II | clear | $0.40 \times 10^{-4}$ | $8.5 \times 10^{-6}$ | $9.0 \times 10^{-8}$ | 0.66 | 0.62 | A | B | C |
| III | mostly soluble yellow | $0.12 \times 10^{-4}$ | $4.0 \times 10^{-6}$ | $4.0 \times 10^{-8}$ | 0.84 | 0.70 | B | B+ | B− |
| IV | Clear | $0.25 \times 10^{-6}$ | $0.15 \times 10^{-6}$ | $3.0 \times 10^{-10}$ | 0.80 | 0.64 | B | B | B− |
| V | clear | $0.70 \times 10^{-6}$ | $2.0 \times 10^{-8}$ | $4.0 \times 10^{-12}$ | 0.70 | 0.66 | A | A | C |
| VII | mostly soluble very cloudy | $0.50 \times 10^{-8}$ | $5.8 \times 10^{-10}$ | $1.0 \times 10^{-12}$ | 0.96 | 0.70 | B | B | A− |

[1]Appearance of 10% polymer in methanol solution
[2]In rating Fingerprint Resistance, the following scale was used:
A = Good B = Fair C = Poor
[3]In rating Abrasion Resistance, the following scale was used:
A = Good B = Fair C = Poor According to surface conductivity tests, Polymer II is the most conductive polymer of the group, and Polymer I is the second most conductive polymer. All five polymers tested are capable of yielding desirable conductivity for the transparency film so long as the proper coating weight on the film is selected. All have poor having a surface resistivity equal to or exceeding about $1\times10^{14}$ ohms per square, (c) an electrically conductive layer comprising an electrically conductive material carried on a second major surface of said film base, the improvement wherein said conductive material of said conductive layer does not migrate to objects which come in contact with said conductive layer, and said conductive layer further has a surface resistivity of from about $1\times10^{11}$ ohms per square to about $5\times10^{13}$ ohms per square.

2. The film of claim 1 wherein the electrically conductive layer further comprises a protective coating layer coated over said electrically conductive material.

3. The film of claim 1 or 2 wherein the film base material is selected from the group consisting of polyesters, polycarbonates, and polysulfones.

4. The film of claim 1 or 3 wherein the toner-receptive layer material is a transparent polymeric material.

5. The film of claim 1 or 3 wherein the electrically conductive material in the electrically conductive layer is a reaction product of partially chloromethylated polystyrene.

6. The film of claim 5 wherein the reaction product of partially chloromethylated polystyrene is selected from the group consisting of

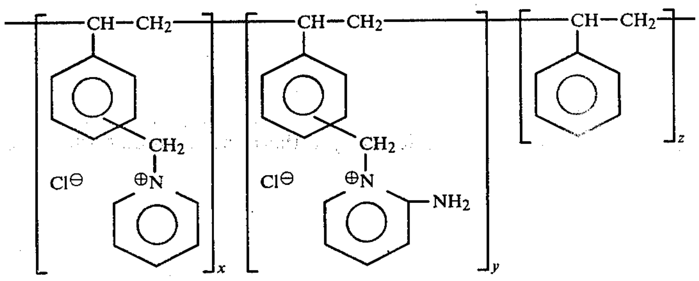

wherein
$x+y+z=1.0$, and
x represents the mole fraction of the pyridine adduct in the copolymer,
y represents the mole fraction of the 2-amino pyridine adduct in the copolymer,
z represents the mole fraction of the unsubstituted phenyl portion of the copolymer,

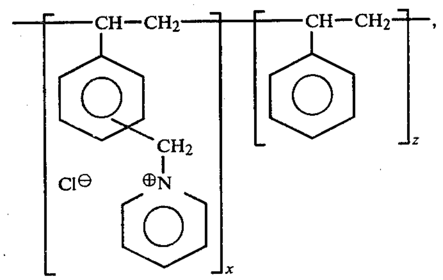

wherein
$x+z=1.0$, and
x represents the mole fraction of the pyridine adduct in the copolymer,
z represents the mole fraction of the unsubstituted phenyl portion of the copolymer,

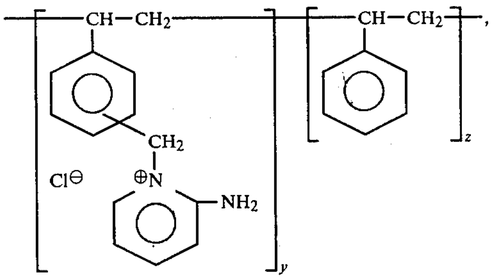

wherein
$y+z=1.0$, and
y represents the mole fraction of the 2-amino pyridine adduct in the copolymer,
z represents the mole fraction of the unsubstituted phenyl portion of the copolymer,

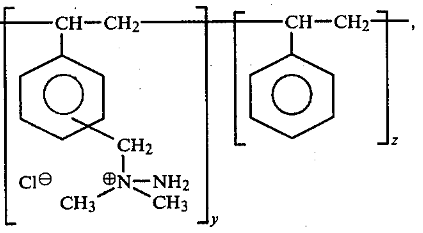

wherein
$y+z=1.0$, and
y represents the mole fraction of the dimethyl hydrazine adduct in the copolymer,
z represents the mole fraction of the unsubstituted phenyl portion of the copolymer,

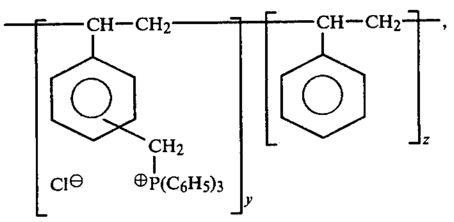

wherein
$y+z=1.0$, and
y represents the mole fraction of the triphenyl phosphine adduct in the copolymer,
z represents the mole fraction of the unsubstituted phenyl portion of the copolymer,

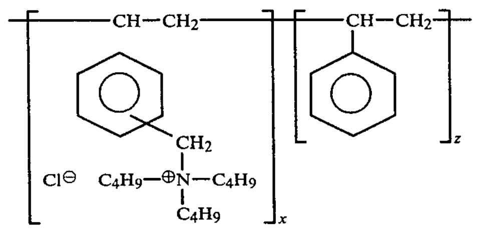

wherein x+z=1.0, and x represents the mole fraction of the tributylamine adduct in the copolymer, z represents the mole fraction of the unsubstituted phenyl portion of the copolymer.

7. The film of claim 3 wherein the electrically conductive material is water soluble.

8. The film of claim 7 wherein the electrically conductive material is a quaternary ammonium polymer.

9. The film of claim 1 or 3 wherein one side of the film base includes a primer coating between the film base and the toner-receptive layer.

10. The film of claim 9 wherein the other side of the film base further includes a primer coating between the film base and the layer of electrically conductive material.

11. The film of claim 1 or 3 wherein one side of the film base includes a primer coating between the film and the layer of electrically conductive material.

12. The film of claim 10 wherein the primer is selected from the group consisting of polyester resins, polyvinyl acetate, and polyvinylidene chloride.

13. The film of claim 11 wherein the primer is selected from the group consisting of polyester resins, polyvinyl acetate, and polyvinylidene chloride.

14. The film of claim 12 wherein the primer is selected from the group consisting of polyester resins, polyvinyl acetate, and polyvinylidene chloride.

15. The film of claim 1 or 3 wherein the electrically conductive material is an inorganic material.

16. The film of claim 15 wherein the electrically conductive material is selected from the group consisting of electrically conductive metals and electrically conductive metal oxides.

17. The film of claim 1 or 3 wherein the electrically conductive material is a resin formed by combining an epoxy silane and a silane sulfonate derived from an epoxy silane.

* * * * *

UNITED STATES PATENT AND TRADEMARK OFFICE
CERTIFICATE OF CORRECTION

PATENT NO. : 4,480,003

DATED : October 30, 1984

INVENTOR(S) : Donald W. Edwards, Terrance J. Russell, Donald J. Williams

It is certified that error appears in the above-identified patent and that said Letters Patent is hereby corrected as shown below:

Col. 8, line 20, "$10^{16}$" should read --$10^{15}$--.

Col. 13, line 42, "fraction" should read --friction--.

Col. 14, line 29, "eight" should read --weight--.

Col. 15, line 51, "Ccontrol" should read --Control--.

Col. 15, line 60, "and" should read --an--.

Col. 19, line 31, "5" should not occur after --%--.

Col. 23, line 18, "claim 3" should read --claim 2--.

Signed and Sealed this

*Eleventh* Day of *June 1985*

[SEAL]

*Attest:*

DONALD J. QUIGG

*Attesting Officer* *Acting Commissioner of Patents and Trademarks*